United States Patent [19]

Konopka

[11] Patent Number: 4,709,320

[45] Date of Patent: Nov. 24, 1987

[54] LOW VOLTAGE SHUTDOWN CIRCUIT

[75] Inventor: John G. Konopka, Ingleside, Ill.

[73] Assignee: Zenith Electronics Corporation, Glenview, Ill.

[21] Appl. No.: 922,373

[22] Filed: Oct. 23, 1986

[51] Int. Cl.$^4$ ............................................. H02H 7/122
[52] U.S. Cl. ..................................... 363/56; 323/284; 323/288; 323/299; 323/902; 361/92
[58] Field of Search ............... 323/242, 284, 288, 299, 323/300, 326, 902; 363/41, 55–56, 95–97; 361/86, 92

[56] References Cited

U.S. PATENT DOCUMENTS 3,749,944  7/1973  Luebrecht .................... 361/92 X
4,027,204  5/1977  Norbeck ....................... 361/92 X
4,634,956  4/1987  Davis et al. .................. 323/285 X Primary Examiner—Peter S. Wong

[57] ABSTRACT

A low voltage shutdown circuit for a PWM power supply includes a voltage divider supplying bias for a transistor having a load resistor that is part of an integrating network. The capacitor in the integrating network is coupled to a voltage sensitive switch (Diac) which feeds an LED detector in a photo optic coupler. Under normal conditions, the transistor is in saturation and the capacitor is discharged. The transistor comes out of saturation when the voltage level across the divider drops to a predetermined level and the capacitor charges to the trigger voltage of the Diac, which fires the LED in the photo optic coupler for developing a shut-off signal.

1 Claim, 2 Drawing Figures

LOW VOLTAGE SHUTDOWN CIRCUIT

BACKGROUND OF THE INVENTION

This invention relates generally to shutdown circuits and specifically to a shutdown circuit for a power supply utilizing a pulse width modulators (PWM).

Switch mode power supplies have found rapid acceptance because of their high efficiency and adaptability to changing load current requirements. They are widely used in conjunction with electronic consumer products and computer equipment. Even in large main frame computer installations, where the power may be derived from 240 volt three phrase power lines, pulse width modulated power supplies are utilized for supplying the low voltage, high current requirements of the connected computers from the high input DC voltage developed by the main rectifier system. A drawback of pulse width modulated supplies is that they tend to overheat in the event of significant voltage drops on the input circuit. In most cases, it is preferable to shut down the power supply and the attached equipment, which is sensitive to voltage, in the presence of sustained low input voltages.

The circuit of the invention provides an economical, efficient, low voltage shutdown arrangement for sensing when the input voltage has dropped to a predetermined level for a predetermined time period and for initiating a utilization device for developing a shutdown signal.

OBJECTS OF THE INVENTION

A principal object of the invention is to provide a novel, low voltage shutdown circuit.

Another object of the invention is to provide a low voltage shutdown circuit for a PWM power supply.

A further object of the invention is to provide a low voltage power supply that is very efficient in operation.

BRIEF DESCRIPTION OF THE DRAWINGS

These and other objects of the invention will be apparent upon reading the following description in conjunction with the drawings in which.

DESCRIPTION OF THE PREFERRED EMBODIMENT

Figure 1:
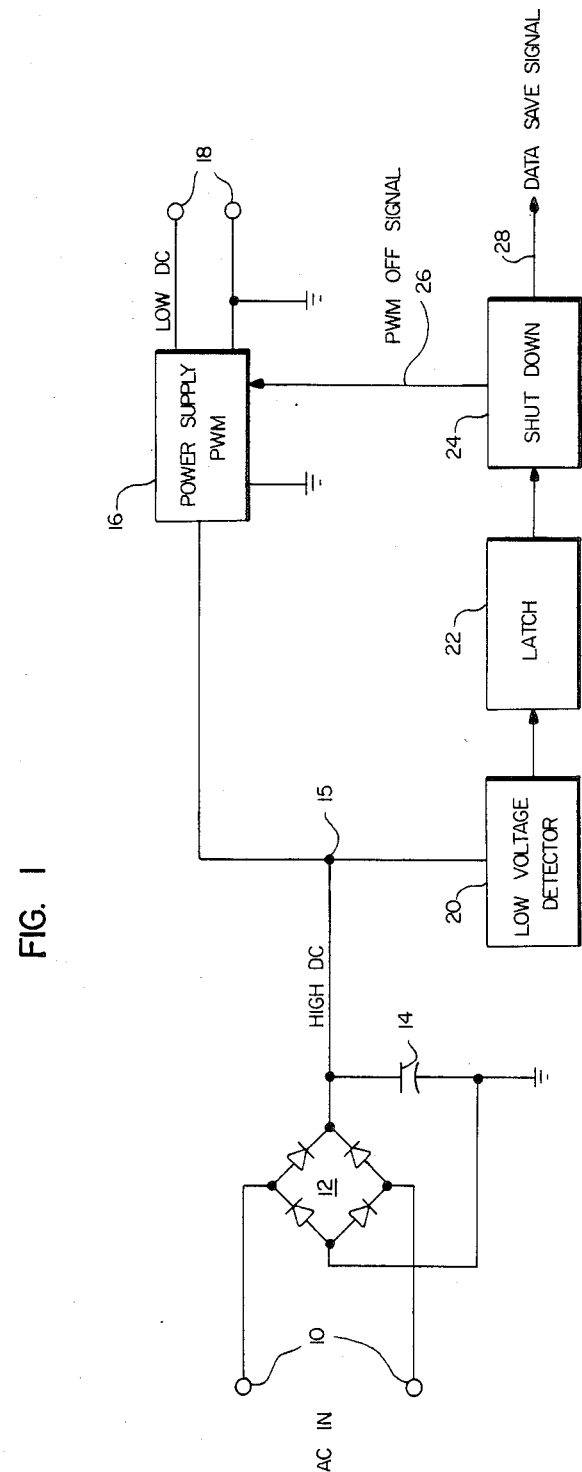
FIG. 1 is a partial block diagram of a power supply arrangement utilizing the invention.

Referring to FIG. 1, a pair of input power terminals 10 are shown for connection to a single phase AC input power source (not shown). Input terminals 10 are coupled across a bridge rectifier arrangement 12 which develops a high DC voltage across a filter capacitor 14. This high DC voltage is supplied to a terminal 15. Terminal 15 is coupled to the input of a power supply 16 that includes a pulse width modulator for converting the high DC input voltage to a low DC output voltage which is applied to a pair of output terminals 18. A low voltage detector 20 is connected to high DC terminal 15 and in turn supplies a latch 22 which is coupled to a shutdown circuit 24. Shutdown circuit 24 has a pair of output leads 26 and 28, one for supplying a PWM OFF signal to the pulse width modulator in power supply 16 and another for supplying a DATA SAVE signal to peripheral computer equipment (not shown) for instructing the equipment to save data in the system onto a hard or a floppy disc, or other safe storage, since the operating voltage will soon disappear. For the sake of brevity and clarity in describing the invention, details of the input rectifier arrangement, the PWM power supply and the latch and shutdown circuits are not given. It will be understood that well-known elements may be utilized and that such elements form no part of the present invention.

Figure 2:
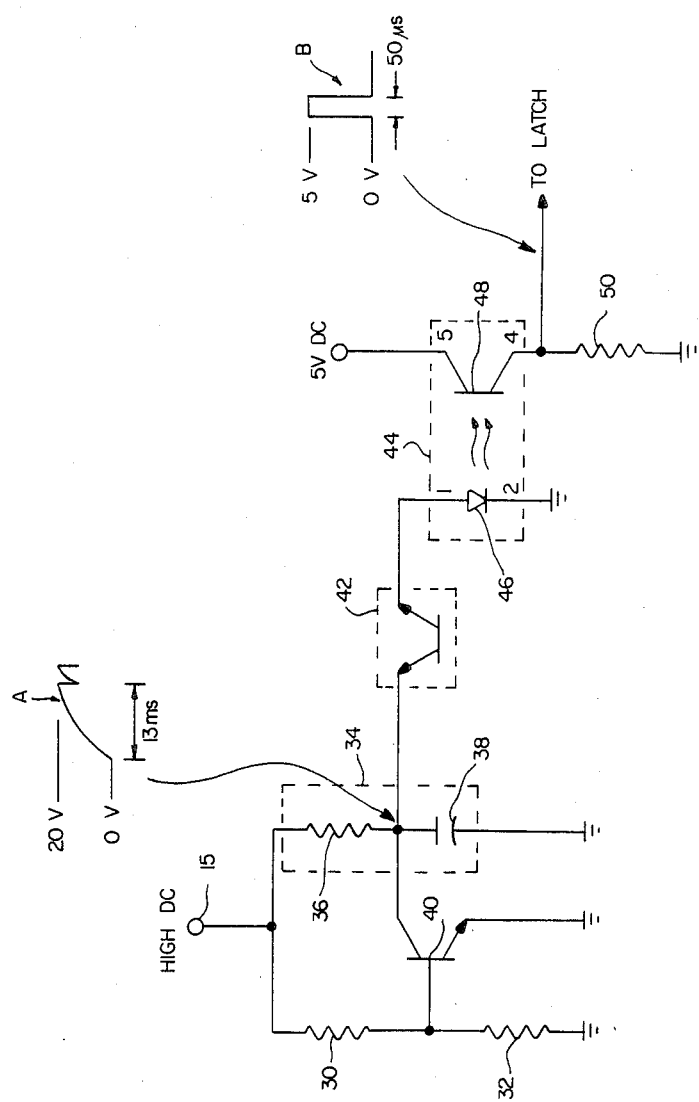
FIG. 2 is a partial schematic diagram of the low voltage detector of the invention.

In FIG. 2, a voltage divider comprising a pair of resistors 30 and 32 is connected between high voltage DC terminal 15 and ground. The junction of the voltage divider is connected to the base of an NPN transistor 40 that has its emitter connected to ground and its collector connected to terminal 15 through a resistor 36. A capacitor 38 is connected between the collector of transistor 40 and ground. The collector of transistor 40 is coupled to a voltage sensitive switching device 42 which in turn is connected to the input of a photo optic coupler 44. The voltage sensitive switching device may be a type IN5758 Diac. The photo optic coupler includes a light emitting diode (LED) 46 which, when energized by a sufficient electrical current, emits light that is received by a companion photo transistor 48 that is connected between a 5 volt source of DC voltage and a grounded resistor 50. Photo optic coupler 44 not only provides ground isolation between the shutdown circuit and the equipment which it controls, but also enables the conversion from the high DC voltage to the low TTL voltage required. The output of the photo optic coupler is developed across resistor 50 and, as shown by the adjacent waveform B, consists of a pulse 5 volts in amplitude and 50 microseconds in duration.

As indicated by the dashed line encircling the components, resistor 36 and capacitor 38 form an RC integrating network 34 that has a charge characteristic as indicated by adjacent waveform A. The components are selected such that the time for the integrating network to develop twenty volts across capacitor 38 is 13 milliseconds. Twenty volts is the trigger voltage for voltage sensitive switch 42, it being apparent that the voltage across capacitor 38 would rise to the full value of that present at terminal 15 unless prevented from doing so. Under normal conditions of voltage at terminal 15, resistors 30 and 32 are selected such that transistor 40 is in saturation and consequently, its collector is near ground potential. Thus, the voltage across capacitor 38 is normally zero. In the event of a drop in the voltage at terminal 15 of a magnitude sufficient to bring transistor 40 out of saturation, the potential at its collector tends to rise, resulting in charging of capacitor 38 through resistor 36. If the voltage drop at terminal 15 remains for a sufficient period of time, capacitor 38 charges to the twenty volt breakdown level of Diac switch 42 which then conducts current between its terminals. Consequently, the stored energy in capacitor 38 is discharged through LED 46 in photo optic coupler 44 which causes a pulse of light to be emitted. This light is received by photo transistor 48 in the photo optic coupler and results in a 5 volt pulse that is supplied to the latch in FIG. 1 for triggering the shutdown apparatus.

It will be appreciated that the delay time of 13 milliseconds is selected as a matter of choice and may readily be changed by adjustment of the values of resistor 36 and capacitor 38 and the nominal voltage of terminal 15. Shortening the charge time may result in unnecessary shutdowns due to temporary voltage drops. The charge time should also be sufficiently long to prevent the shutdown circuit from operating during startup when the voltage at terminal 15 is rising. In the environment chosen for purposes of description, the voltage at terminal 15 rises from zero to its peak in about 4 milliseconds and consequently, the 13 millisecond charging time for integrating circuit 34 to reach the breakdown voltage of Diac switch 42 assures that the shutdown circuit will not trigger during this period.

In summary, resistors 30, 32 and transistor 40 provide the function as sensing means to determine when the potential of terminal 15 has dropped to a predetermined point. The integrating circuit of resistor 36 and capacitor 38 charges capacitor 38 until the breakdown or trigger potential of the voltage sensitive switch 42 is reached. Switch 42 operates to activate the utilization means, which takes the form of photo optic coupler 44. With the inventive arrangement, the need for large, high wattage resistors for deriving the low voltage, high current power for LED 46 is eliminated. Rather, capacitor 38 is charged, at a comparatively low level over a period of time, and quickly discharged to develop the required energy for operating LED 46.

It will be appreciated that numerous changes in the described embodiment of the invention will be apparent to those skilled in the art without departing from its true spirit and scope. The invention is to be limited only as defined in the claims.

What is claimed is:

1. In combination:
    a switch mode power supply including a pulse width modulator for supplying a load circuit requiring a first DC voltage from a supply circuit developing a second, higher, DC voltage;
    a voltage divider coupled across said supply circuit;
    a transistor having its base coupled to said voltage divider, said voltage divider developing a bias voltage for said transistor;
    an integrating circuit comprising a resistor and a series connected capacitor coupled across said supply circuit;
    said resistor being connected as the load for said transistor and said transistor being operated in saturation to maintain the voltage across said capacitor at a low level in the presence of said second DC voltage;
    a voltage sensitive switch connected to said capacitor;
    a photo optic coupler coupled to said capacitor, said photo optic coupler including an LED diode connected in series with said voltage sensitive switch, and a photo transistor; and
    said transistor being driven out of saturation responsive to decreases in said second DC voltage and permitting said capacitor to develop a charge, said voltage sensitive switch being driven conductive when the charge on said capacitor reaches a trigger level to operate said LED diode by discharge of said capacitor therethrough and thereby energize said photo transistor, the RC time constant of said integrating circuit being greater than the time required for said supply circuit to develop said second DC voltage after turn-on.

* * * * *